(12) United States Patent
Tashiro et al.

(10) Patent No.: US 11,618,504 B2
(45) Date of Patent: Apr. 4, 2023

(54) FRONT VEHICLE-BODY STRUCTURE OF VEHICLE

(71) Applicant: MAZDA MOTOR CORPORATION, Hiroshima (JP)

(72) Inventors: Kuniyoshi Tashiro, Aki-gun (JP); Shigeaki Watanabe, Aki-gun (JP); Ryuichi Takahashi, Aki-gun (JP); Masatoki Kito, Aki-gun (JP); Susumu Kuroda, Aki-gun (JP); Reiko Yoshiura, Aki-gun (JP); Tomohiro Shimada, Aki-gun (JP); Kazumichi Takeshige, Aki-gun (JP); Qiang Wang, Aki-gun (JP); Toshihiro Nakaza, Aki-gun (JP); Satoru Eguchi, Aki-gun (JP); Hayato Miyazaki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 187 days.

(21) Appl. No.: 17/161,320

(22) Filed: Jan. 28, 2021

(65) Prior Publication Data

US 2021/0261194 A1   Aug. 26, 2021

(30) Foreign Application Priority Data

Feb. 20, 2020   (JP) .............................. JP2020-027112

(51) Int. Cl.
  *B62D 21/15*   (2006.01)
  *B60R 19/04*   (2006.01)
  *B60R 19/24*   (2006.01)

(52) U.S. Cl.
  CPC ............ *B62D 21/152* (2013.01); *B60R 19/04* (2013.01); *B60R 19/24* (2013.01)

(58) Field of Classification Search
  CPC ........ B60R 19/24; B60R 19/04; B62D 21/152
  See application file for complete search history.

(56) References Cited

U.S. PATENT DOCUMENTS

| | | | |
|---|---|---|---|
| 9,783,152 B2 * | 10/2017 | Voss | .................. B60R 21/34 |
| 2002/0171262 A1 | 11/2002 | Ozawa | |
| 2004/0251716 A1 * | 12/2004 | Choi | .................. B60R 21/34 |
| | | | 296/187.03 |
| 2013/0088042 A1 | 4/2013 | Voss et al. | |
| 2014/0138986 A1 | 5/2014 | Tsuneyama et al. | |

FOREIGN PATENT DOCUMENTS

| | | |
|---|---|---|
| CN | 103043018 A | 4/2013 |
| JP | 2013018352 A | 1/2013 |
| WO | 01/28821 A1 | 4/2001 |

* cited by examiner

*Primary Examiner* — Dennis H Redder
*Assistant Examiner* — Melissa Ann Bonifazi
(74) *Attorney, Agent, or Firm* — Studebaker & Brackett PC

(57) ABSTRACT

There is provided a bracket which connects an apron reinforcement provided below a bonnet and an upper portion of a fender provided on an outward side, in a vehicle width direction, of the bonnet. The bracket comprises a fender fixing portion fixed to a flange portion of an upper end portion of the fender, a body portion extending downwardly from the fender fixing portion and positioned on the outward side of the apron reinforcement, and an apron-reinforcement fixing portion extending from an inward side, in the vehicle width direction, of the body portion toward the apron reinforcement and fixed to the apron reinforcement. The body portion is provided with a curved part which is configured to be curved outwardly in the vehicle width direction.

14 Claims, 9 Drawing Sheets

FRONT VEHICLE-BODY STRUCTURE OF VEHICLE

BACKGROUND OF THE INVENTION

The present invention relates to a front vehicle-body structure of a vehicle which comprises a bonnet (engine hood) provided above a power unit, a pair of right-and-left fenders positioned on an outward side, in a vehicle width direction, of the bonnet and provided at vehicle-body side portions, a pair of apron reinforcements provided below the bonnet and extending in a vehicle longitudinal direction, and a bracket connecting an upper portion of the fender and the apron reinforcement.

In general, a front vehicle-body structure which comprises a rain rail portion as a rain gutter which is provided at an upper portion of a fender is known as exemplified in Japanese Patent Laid-Open Publication No. 2013-018352 (US 2014/0138986 A1). This rain rail portion is formed integrally with an inward edge, in a vehicle width direction, of the upper portion of the fender which extends in a vehicle longitudinal direction in order to receive water which comes into a vehicle-body inside through a gap formed at a boundary between the fender and the bonnet and drain this received water to a vehicle-body outside.

The above-described patent document discloses the structure in which the rain rail portion substantially horizontally extends inwardly, in the vehicle width direction, toward an apron reinforcement below the bonnet in a vehicle elevational view and this rain rail portion is supported at an upper face of the apron reinforcement via a bracket (shock absorbing bracket) from a downward side.

The bracket disclosed in the above-described patent document is provided with an attachment portion for attaching the rain rail portion and a pair of plate-shaped support leg portions which extend downwardly from the attachment portion and lower end portions of which are fixed to the apron reinforcement.

In particular, the bracket disclosed in the above-described patent document is formed as a shock absorbing bracket which is provided with a bent portion which is configured to be bent over an entire part, in a width direction, of the support leg portion extending in a vertical direction at a central position of the support leg portion. Accordingly, in a case where a pedestrian hits against (collides with) around the boundary between the bonnet and the fender and thereby a collision load (large load) is inputted to around this boundary, the shock absorbing bracket is deformed with a deformation causing point at the bent portion, so that the pedestrian protection performance (collision-energy absorption performance) is improved.

Meanwhile, the bracket disclosed in the above-described patent document is configured, for example, such that respective plate faces of the pair of support leg portions are inclined relative to the vertical direction in such a manner that a distance therebetween increases as it goes downwardly. In this case, this bracket has the higher modulus of section than a bracket which is configured such that respective plate faces of a pair of support leg portions extend in the vertical direction.

Thereby, the support rigidity of the fender by means of the bracket against a small load which is inputted to the fender by a hand pressing down an upper portion of the fender or the like can be secured.

In the structure disclosed in the above-described patent document, however, there is a concern that in a case where the pedestrian hits against around the boundary between the bonnet and the fender as described above, the bonnet may contact with the rain rail portion which is provided below the bonnet and above the apron reinforcement, so that a stroke of downward plastic deformation of the bonnet may be hindered.

It may be considered as countermeasures for this that the above-described bracket which exists between the bonnet and the apron reinforcement together with the rain rail portion is weakened. In this case, however, the support rigidity of the fender by means of the bracket improperly decreases, so that there is room for further improvement in order to attain compatibility of the pedestrian protection performance and the fender support rigidity at a high level.

SUMMARY OF THE INVENTION

The present invention has been devised in view of the above-described matters, and an object of the present invention is to provide a front vehicle-body structure of a vehicle which can compatibly attain the pedestrian protection performance based on the deformation of the bracket connecting the bonnet and the fender and the fender support rigidity against the small load inputted to the fender by the hand pressing down the fender or the like in a case where the pedestrian hits against around the boundary between the bonnet and the fender.

The present invention is a front vehicle-body structure of a vehicle, comprising a bonnet provided above a power unit, a pair of right-and-left fenders positioned on an outward side, in a vehicle width direction, of the bonnet and provided at vehicle-body side portions, a pair of apron reinforcements provided below the bonnet and extending in a vehicle longitudinal direction, and a bracket connecting an upper portion of the fender and the apron reinforcement, wherein the bracket comprises a fender fixing portion fixed to an upper end portion of the fender, a body portion extending downwardly from the fender fixing portion and positioned on an outward side, in the vehicle width direction, of the apron reinforcement, and an apron-reinforcement fixing portion fixed to the apron reinforcement, and the body portion of the bracket is provided with a curved part which is configured to be curved outwardly in the vehicle width direction.

According to the present invention, since the body portion of the bracket is positioned on the outward side, in the vehicle width direction, of the apron reinforcement, the bonnet can be deformed in a space between the bonnet and an upper face of the apron reinforcement in a case where the pedestrian hits against around the boundary between the bonnet and the fender, i.e., in a case where the collision load (large load) is inputted to around this boundary.

That is, since the bracket which is to be deformed according to the downward deformation of the bonnet such that it is compressed downwardly exits in the space between the bonnet and the upper face of the apron reinforcement, it can be suppressed properly that the downward deformation of the bonnet is hindered.

Further, since the body portion of the bracket has the curved part, the curved part can cause the bracket to be deformed in the case where the large load is inputted to around the bonnet and the fender. Accordingly, the pedestrian protection performance can be improved.

Meanwhile, since the bracket connects the upper portion of the fender and the apron reinforcement, the fender is supported at the apron reinforcement via the bracket. That is, the bracket serves as a support member of the fender in a normal state where the large load described above is not inputted to around the boundary between the bonnet and the fender. Accordingly, even in a case where the small load is inputted to the fender because of the hand pressing down the upper portion of the fender or the like, since the curved part of the bracket has a smoother curved shape than a bent portion which is configured to be bent in an acute-angle shape, stress concentration is prevented from occurring at the bracket. Consequently, the deformation of the bracket can be suppressed.

Thus, the present invention can improve the pedestrian protection performance in the case where the pedestrian hits against around the boundary between the bonnet and the fender and thereby the collision load is inputted to around this boundary. Moreover, the support rigidity of the fender against the small load inputted to the fender by the hand pressing down the upper portion of the fender or the like can be secured by means of the bracket as well.

In an embodiment of the present invention, the body portion of the bracket is provided with an inclined part which is positioned between the fender fixing portion and the curved part and configured to be inclined obliquely downwardly-and-outwardly.

According to this embodiment, in the case where the pedestrian hits against around the boundary between the bonnet and the fender, the inclined part is displaced downwardly according to the downward deformation of a section of the fender which is located around the boundary with the bonnet. Accordingly, the curved part can be crushed and deformed, and thereby the collision energy can be absorbed by the bracket properly.

In another embodiment of the present invention, the curved part of the body portion of the bracket is configured as a first curved part, and the body portion of the bracket is provided with a second curved part which is positioned between the fender fixing portion and the first curved part and configured to be curved inwardly in the vehicle width direction.

According to this embodiment, since the body portion of the bracket has the first curved part and the second curved part, not only the first curved part but the second curved part can cause the deformation of the bracket in the case where the collision load (large load) is inputted to around the boundary between the bonnet and the fender.

Accordingly, the bonnet can be deformed more in the space between the bonnet and the upper face of the apron reinforcement by crushing the bracket completely against the collision load, so that the pedestrian protection performance can be further improved.

In another embodiment of the present invention, the body portion of the bracket is formed in a plate shape, which comprises a flat-face part which extends in a flat-face shape and is provided with a fastening face fixedly fastened to the apron reinforcement and flange parts (step parts) which are bent, in a thick direction of the body portion, from a front end and a rear end of the flat-face part.

According to this embodiment, the collision energy which may not be absorbed by the curved part only when the bracket is crushed in the case where the pedestrian hits against around the boundary between the bonnet and the fender can be absorbed properly by the step parts.

Meanwhile, the fender support rigidity against the small load inputted to the fender by the hand pressing down the fender or the like can be increased by the step parts.

In another embodiment of the present invention, the apron-reinforcement fixing portion is fixed to a side wall portion of the apron reinforcement.

According to this embodiment, when the vehicle is assembled, i.e., when the fender is attached to the apron reinforcement via the bracket, a gap or dispersion, in a vehicle vertical direction, of a distance between the fender and the bonnet can be adjusted.

The present invention will become apparent from the following description which refers to the accompanying drawings.

DETAILED DESCRIPTION OF THE INVENTION

Figure 1:
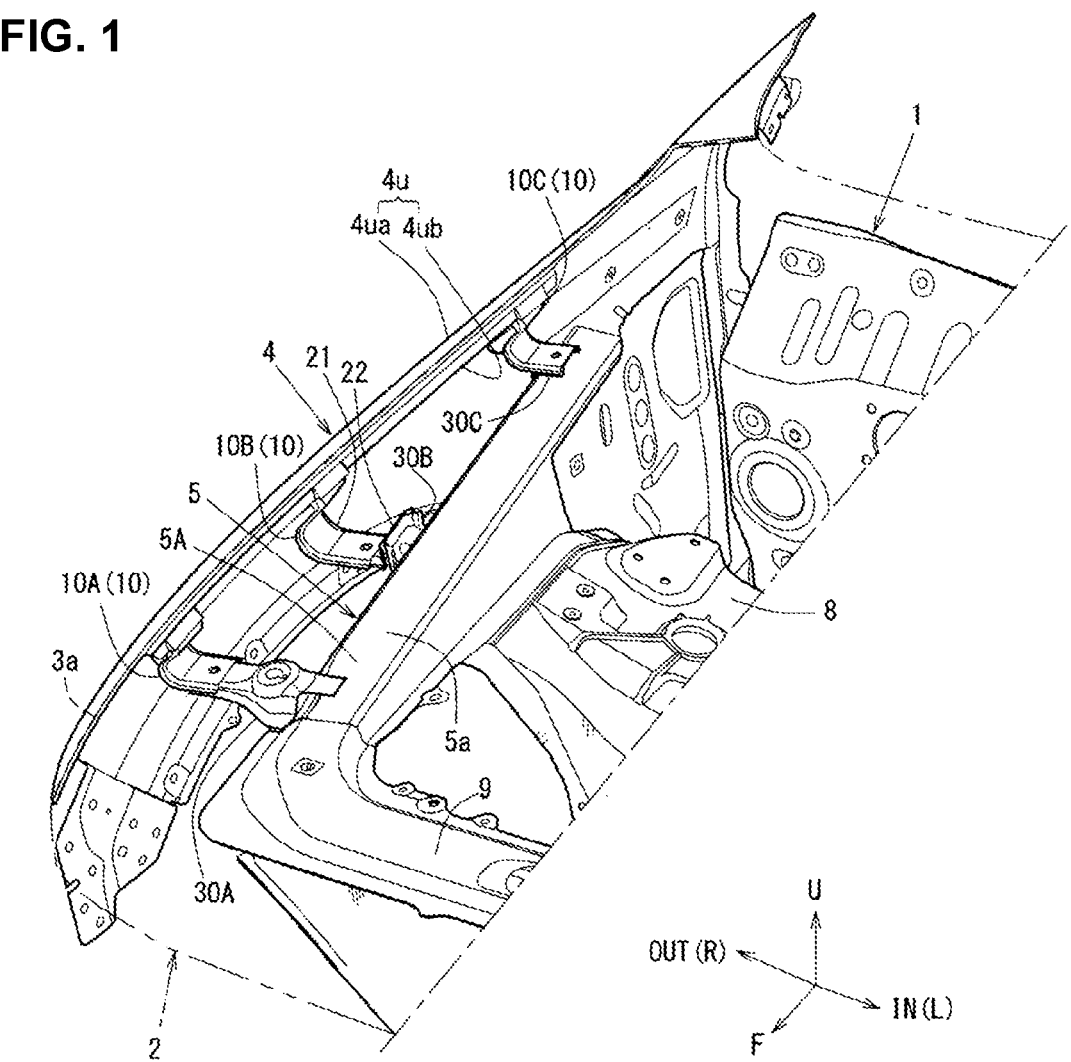
FIG. 1 is a perspective view of a major part of a front vehicle-body structure of a vehicle of the present embodiment, when viewed from an inward-forward-upward oblique side of the vehicle.

Hereafter, an embodiment of the present invention will be described referring to the drawings. In figures, an arrow F shows a forward (front) direction of a vehicle, an arrow R shows a rightward (right) direction of the vehicle, an arrow L shows a leftward (left) direction of the vehicle, an arrow U shows an upward (upper) direction of the vehicle, an arrow OUT shows an outward (outside) direction, in a vehicle width direction, of the vehicle, and an arrow IN shows an inward (inside) direction, in the vehicle width direction, of the vehicle. Further, since a front vehicle-body structure of the present embodiment is substantially symmetrical in the vehicle width direction, a right-side structure of the vehicle will be described primarily.

Figure 2:
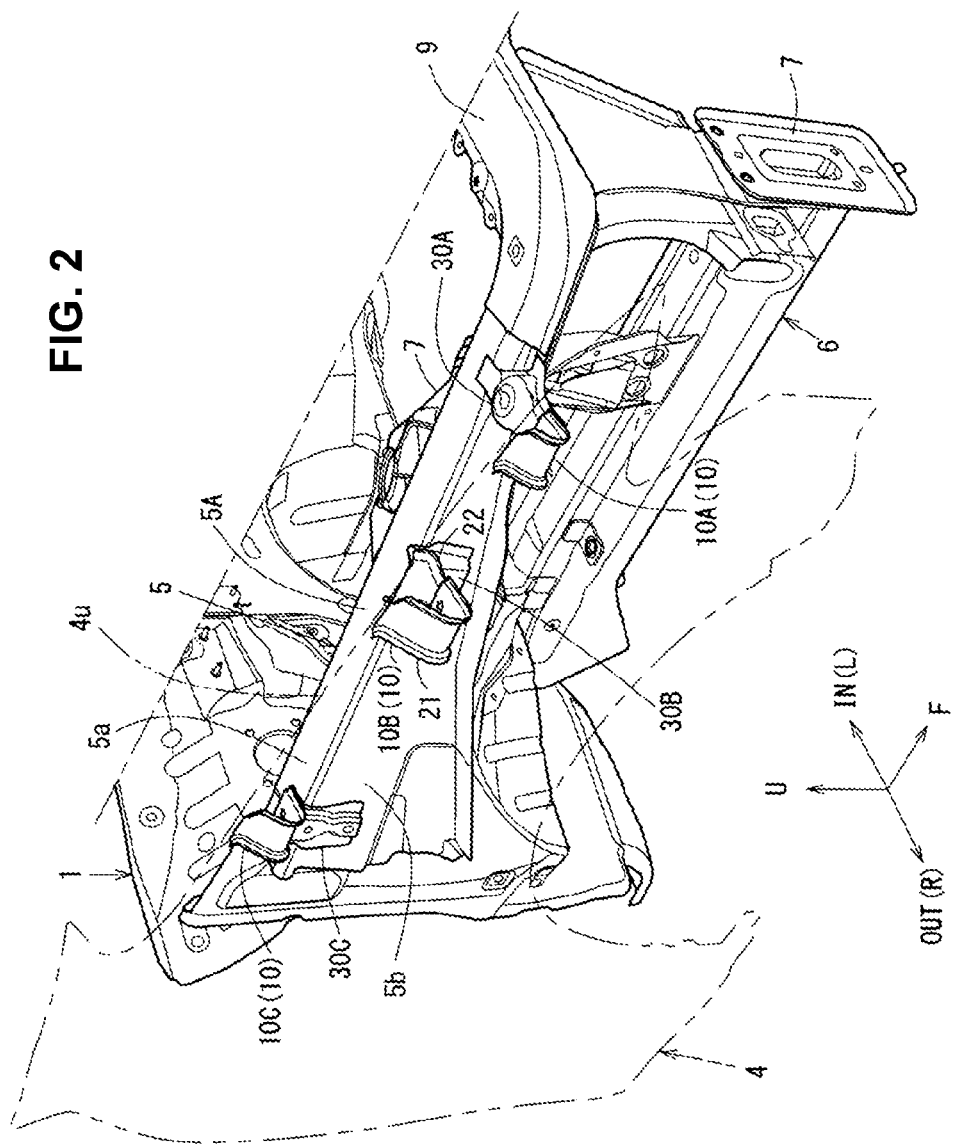
FIG. 2 is a perspective view of the major part of the front vehicle-body structure of the vehicle of the present embodiment, when viewed from an outward-forward-upward oblique side of the vehicle.
Figure 3:
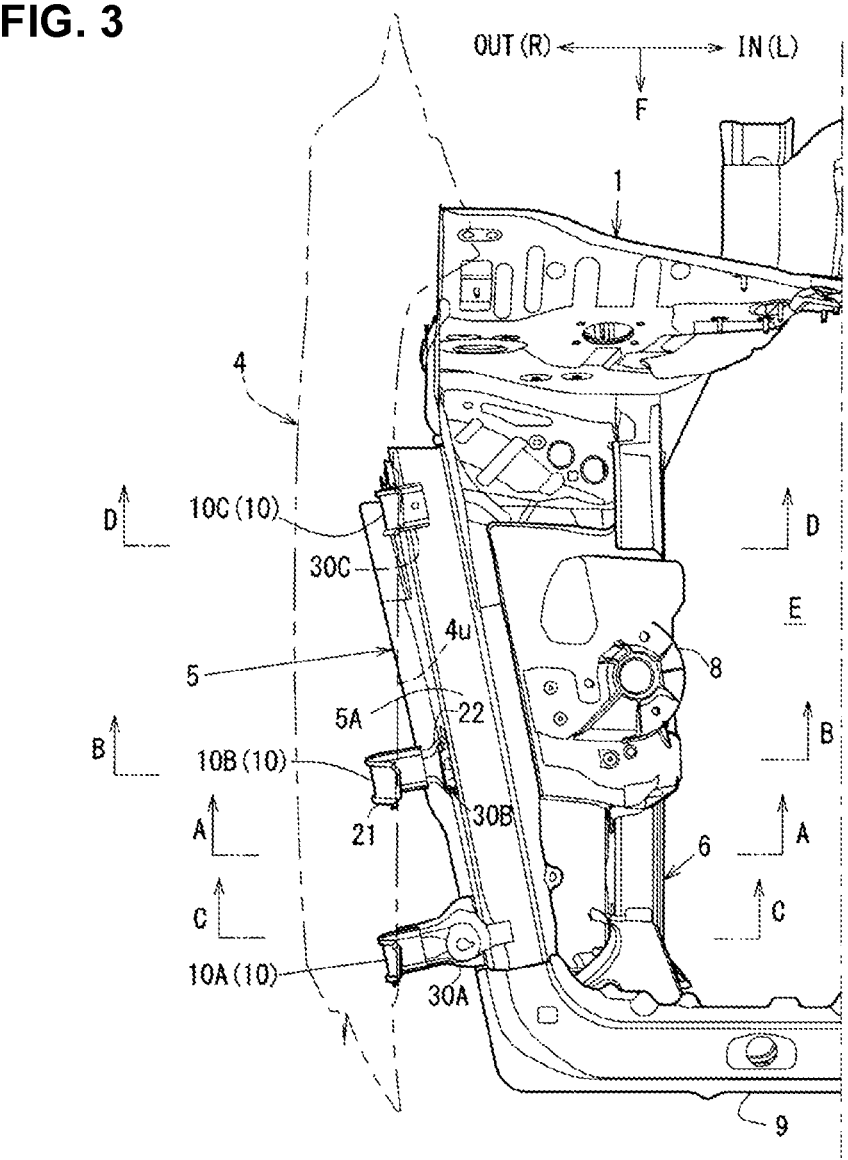
FIG. 3 is a plan view of the major part of the front vehicle-body structure of the vehicle of the present embodiment.
Figure 6:
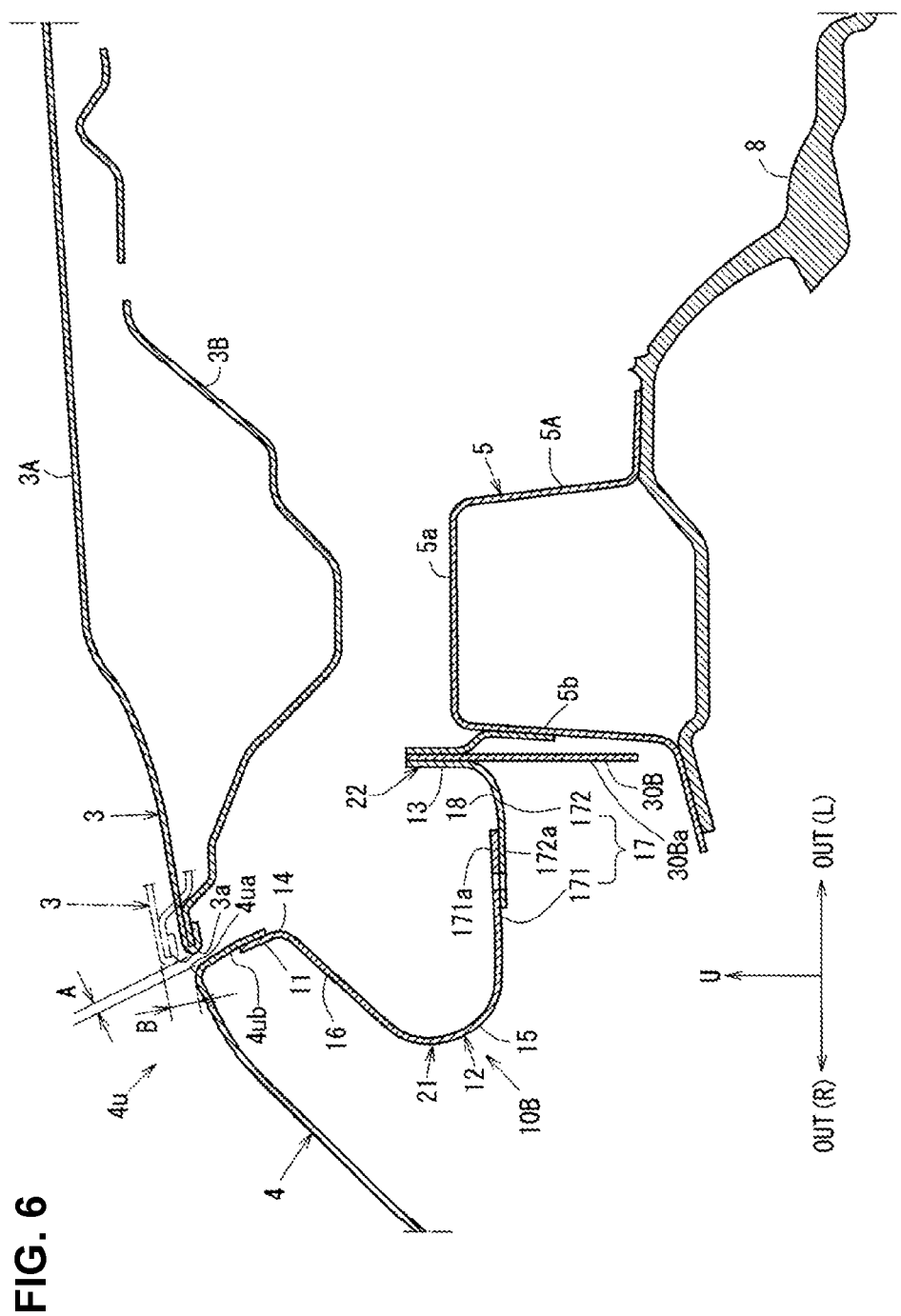
FIG. 6 is a major-part enlarged sectional view taken along line B-B of FIG. 3.
Figure 7A:
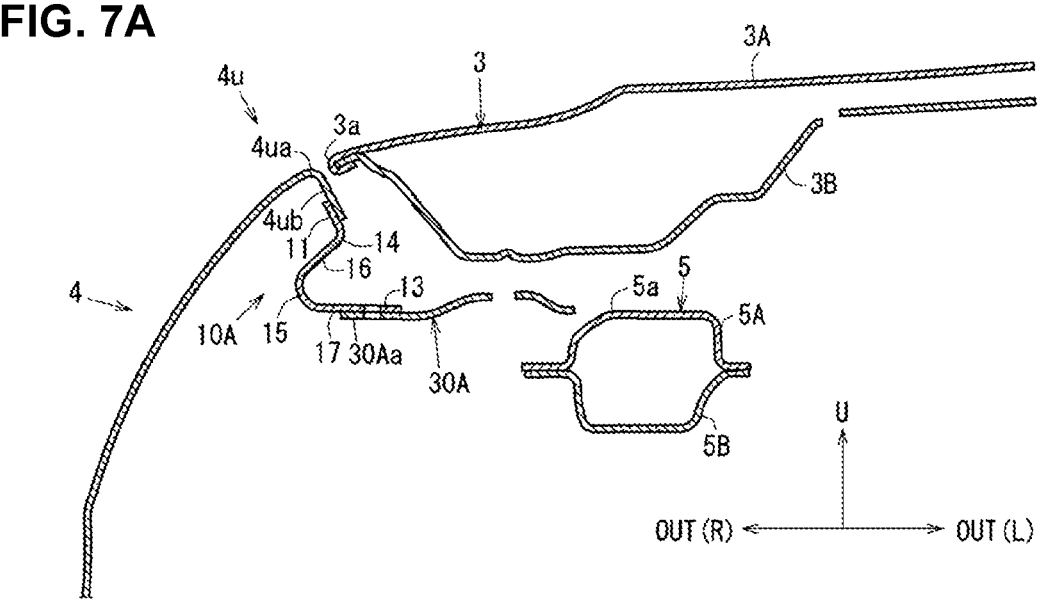
FIG. 7A is a major-part enlarged sectional view taken along line C-C of FIG. 3.

As shown in FIGS. 1-3, the vehicle of the present invention is configured such that an engine room E where an engine (not illustrated) is installed is provided in front of a dash panel 1 which forms a front wall of a cabin (see FIG. 3), and a bonnet (engine hood) 3 is provided above the engine room E (see FIGS. 2, 6 and 7A, B). The bonnet 3 is pivotally attached to a vehicle-body side via a hinge axis (not illustrated) at its rear end, and covers over the engine room E so as to open or close the engine room E.

As shown in FIGS. 6 and 7A, B, the bonnet 3 comprises an outer panel 3A and an inner panel 3B which is arranged below (on a vehicle-body inside of) the outer panel 3A. The outer panel 3A and the inner panel 3B of the bonnet 3 are joined together by hemming That is, an outer peripheral edge of the outer panel 3A is bent, and this bent outer peripheral edge of the outer panel 3A caulks an outer peripheral edge of the inner panel 3B.

As shown in FIGS. 1-4, a pair of front fender panels 4 (hereafter, referred to as "fenders 4") are provided at both sides of the engine room E.

The fender 4 is configured such that it extends in a vehicle longitudinal direction and in a vehicle vertical direction, and its outer surface is formed in a vertical-wall shape as a design surface of a side part of a front-side portion of the vehicle. Herein, as shown in FIG. 2, a lower end of the fender 4 is configured to protrude upwardly along a shape of a wheel arch.

As shown in FIGS. 1, 6 and 7A, B, the fender 4 is provided on the outward side, in the vehicle width direction, of the bonnet 3. Specifically, as shown in FIGS. 6 and 7A, B, since the fender 4 is curved such that its upper side is positioned on the inward side, in the vehicle width direction, of the vehicle, an upper end portion 4u which is positioned at an upper end of the fender 4 is located at the most inward end, in the vehicle width direction, of the fender 4. The fender upper end portion 4u and an outward end 3a, in the vehicle width direction, of the bonnet 3 extend in the vehicle longitudinal direction, and are provided to face each other with a gap generated therebetween.

That is, the fender 4 and the bonnet 3 are configured such that their boundary forms a design surface which is substantially continuous and smooth (flush) in a sectional view perpendicular to the vehicle longitudinal direction.

As shown in FIGS. 1, 4, 6 and 7A, B, the fender upper end portion 4u comprises a fender upper edge side 4ua (ridgeline portion) which projects upwardly and extends in the vehicle longitudinal direction. The fender upper end portion 4u comprises a flange portion 4ub which extends downwardly from the fender upper edge side 4ua. The flange portion 4ub is inclined such that its lower side is positioned on the inward side, in the vehicle width direction, of the vehicle, and this flange portion 4ub is formed integrally with the fender upper edge side 4ua extending in the vehicle longitudinal direction.

As shown in FIGS. 1-4, 6 and 7A, B, a pair of apron reinforcements 5 are provided as a vehicle-body frame member which extends in the vehicle longitudinal direction on the inward side, in the vehicle width direction, of the fender 4 and below the bonnet 3 and has a substantially rectangular-shaped closed cross-section in a section perpendicular to the vehicle longitudinal direction.

The apron reinforcement 5 of the present embodiment extends substantially horizontally and linearly (straightly), being inclined such that its forward side is positioned on the inward side, in the vehicle width direction, of the vehicle (see FIG. 3). A front portion, in the vehicle longitudinal direction, of the apron reinforcement 5 is formed by an apron reinforcement upper 5A which has a hat-shaped cross section opened to the lower side and an apron reinforcement lower 5B which is of a flat-plate shape and joined to the apron reinforcement upper 5A from the downward side (see FIG. 7A).

As shown in FIGS. 6 and 7A, B, the apron reinforcement 5 is located at a position which is downwardly separated from the bonnet 3 and the upper portion of the fender 4. Thereby, a space where the bonnet 3 and the upper portion of the fender 4 can be deformed downwardly in a case where an collision object hits against around a boundary between the bonnet 3 and the fender 4 is formed, so that the pedestrian protection performance is secured.

Herein, as shown in FIGS. 2 and 3, a pair of right-and-left front side frames 6 are provided below and on the inward side, in the vehicle width direction, of the apron reinforcements 5 as another vehicle-body frame member extending in the vehicle longitudinal direction.

The front side frames 6 are joined to the dash panel 1 at their rear middle parts. A pair of right-and-left hinge pillars (not illustrated) which extend in the vehicle vertical direction are provided on the outward both-sides, in the vehicle width direction, of the dash panel 1. A rear end portion of each of a pair of right-and-left crash cans (not illustrated) is fixed to a front end part of each of the front side frames 6 via a set plate 7. A bumper reinforcement (not illustrated) which extends in the vehicle width direction is joined to respective front end portions of the pair of right-and-left crash cans.

As shown in FIG. 3, a suspension tower 8 is provided in an area from respective middle parts to respective rear parts, in the vehicle longitudinal direction, of the apron reinforcement 5 and the front side frame 6 such that the suspension tower 8 extends between the both frame members 5, 6.

The apron reinforcement 5 is joined to the hinge pillar at its rear end, and extends substantially linearly in the vehicle longitudinal direction from the hinge pillar to a position which corresponds to a rear end of the crash can. Respective front ends of the pair of right-and-left apron reinforcements 5 are interconnected by an upper member 9 (see FIGS. 1-3) which extends in the vehicle width direction. Herein, FIGS. 1-4 omit illustration of a base portion (rear portion), in the vehicle longitudinal direction, of the apron reinforcement 5 which is connected to the hinge pillar.

Meanwhile, as shown in FIGS. 1-3, plural brackets 10 (a front bracket 10A, a middle bracket 10B, and a rear bracket 10C) are provided at each of both front sides of the vehicle along the vehicle longitudinal direction such that these brackets 10 respectively connect the upper portion of the fender 4 and the apron reinforcement 5.

That is, the three brackets 10 are provided at a front section, a middle section, and a rear section between the upper portion of the fender 4 and the apron reinforcement 5.

Figure 5A:
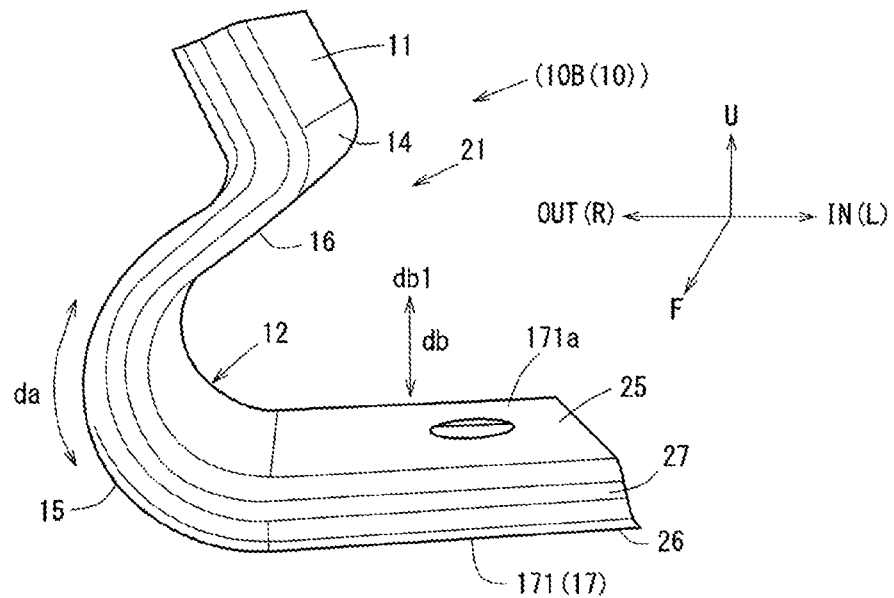
FIG. 5A is a view of a middle bracket of the present embodiment, when viewed from a forward side of the vehicle.
Figure 5B:
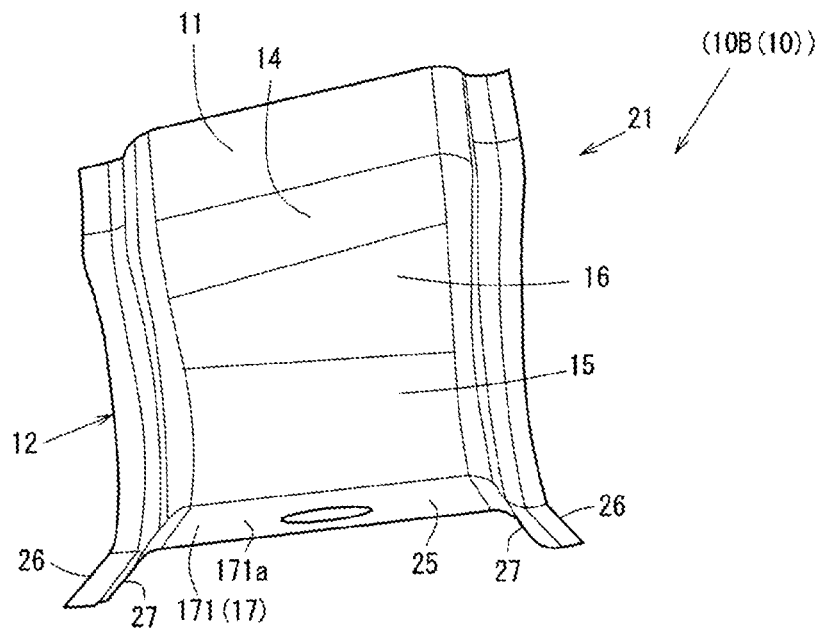
FIG. 5B is a view of the middle bracket of the present embodiment, when viewed from an inward side, in a vehicle width direction, of the vehicle.

These brackets 10 are respectively made of a press-formed steel plate and arranged such that each of their cross sections perpendicular to the vehicle longitudinal direction (see FIGS. 6 and 7A, B) extends along an extension direction da (see FIG. 5A, for example).

Since the three brackets 10 (the front bracket 10A, the middle bracket 10B, and the rear bracket 10C) have a common structure, the middle bracket 10B will be described as a representative.

As shown in FIGS. 5A, B and 6, the middle bracket 10B comprises a fender fixing portion 11 which is fixed to the flange portion 4ub of the fender upper end portion 4u, a body portion 12 which extends downwardly from the fender fixing portion 11 and is positioned on the outward side, in the vehicle width direction, of the apron reinforcement 5, and an apron-reinforcement fixing portion 13 which extends from an inward side, in the vehicle width direction, of the body portion 12 toward the apron reinforcement 5 and is fixed to the apron reinforcement 5.

The body portion 12 is provided with a second curved part 14 which protrudes (is curved) inwardly in the vehicle width direction at an upper end portion of the body portion 12, i.e., a boundary portion of the body portion 12 with the fender fixing portion 11. Further, the body portion 12 is provided with a first curved part 15 which protrudes (is curved) outwardly in the vehicle width direction below the second curved part 14. In the present embodiment, the first curved part 15 has a smaller curvature (a larger radius of curvature, i.e., a smoother curved surface) than the second curved part 14. In the present embodiment, it is preferable that the first curved part 15 and the second curved part 14 be configured to protrude (be curved) smoothly along the extension direction, not to protrude (be curved) in a bent shape having a corner section. Further, while the respective curvatures of the first curved part 15 and the second curved part 14 can be set properly according to a plate thickness, a width, a material, a size of an arrangement space, or the like of the bracket 10, it is preferable that these curvatures be set within a range of 10-20 mm.

Figure 4:
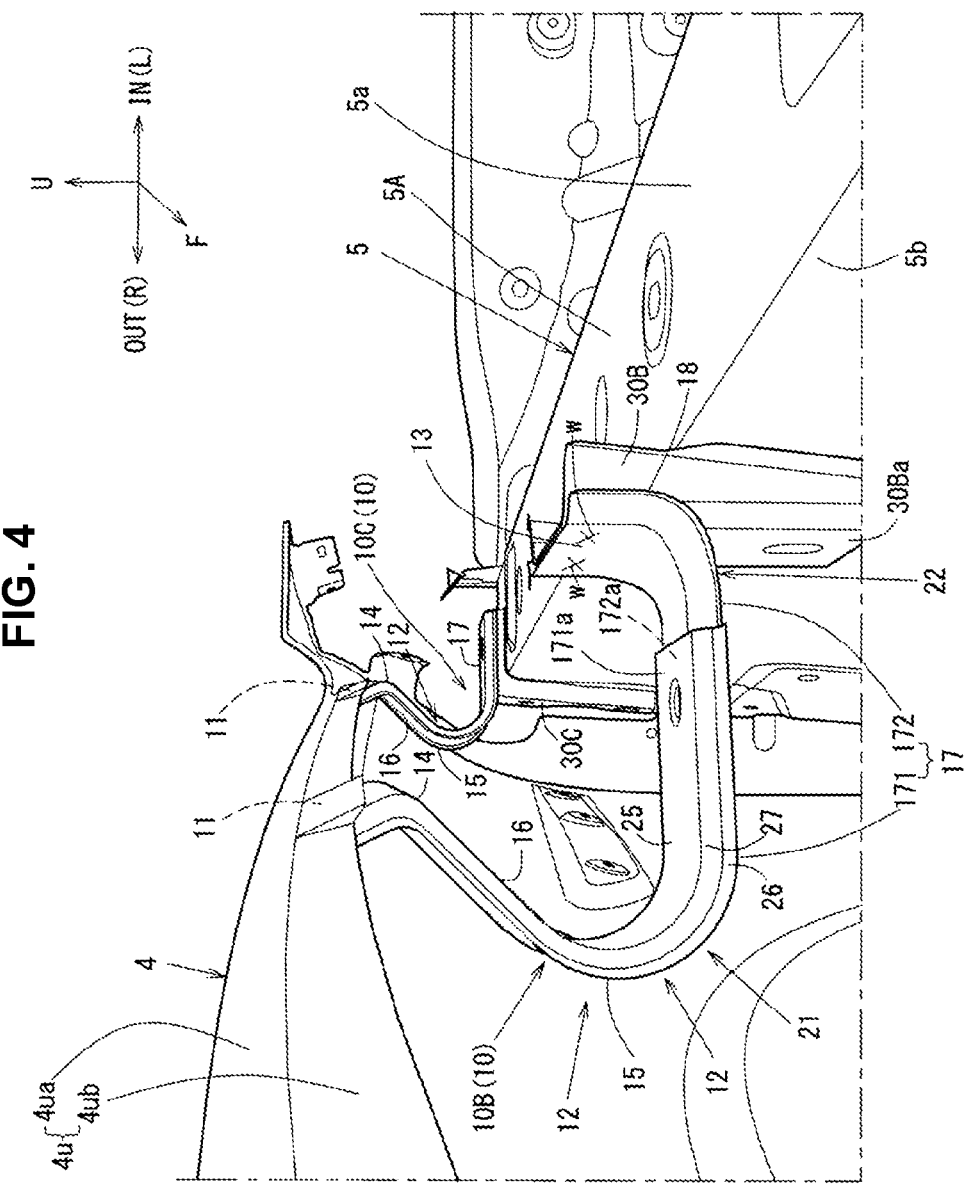
FIG. 4 is a major-part enlarged sectional view taken along line A-A of FIG. 3.

As shown in FIGS. 4, 5A, B and 6, the body portion 12 is further provided with an inclined part 16 which is positioned between the first curved part 15 and the second curved part 14 and configured to extend substantially linearly, being inclined obliquely downwardly-and-outwardly. The body portion 12 is further provided with a horizontal part 17 which is positioned between the first curved part 15 and the apron-reinforcement fixing portion 13 and configured to extend substantially horizontally and linearly in the vehicle width direction. The horizontal part 17 of the middle bracket 10B is located at a lower level than an upper wall 5a of the apron reinforcement 5 (see FIGS. 4 and 6).

The middle bracket 10B is formed in a split structure which is split in the extension direction, which primarily comprises a fender-side structural member 21 and an apron-side structural member 22 as shown in FIGS. 1-4 and 6.

As shown in FIGS. 4, 5A, B and 6, the fender-side structural member 21 is configured such that an inward end, in the vehicle width direction, of a lower section of the fender fixing portion 11 and an inward end, in the vehicle width direction, of an upper section of the inclined part 16 are connected via the second curved part 14, whereas an outward end, in the vehicle width direction, of a lower section of the inclined part 16 and an outward end, in the vehicle width direction, of an outward-side horizontal part 171 of the horizontal part 17 are connected via the first curved part 15.

That is, the fender-side structural member 21 is configured such that its nearly S-shaped cross section perpendicular to the vehicle longitudinal direction is formed by the fender fixing portion 11, the second curved part 14, the inclined part 16, the first curved part 15, and the outward-side horizontal part 171.

The outward-side horizontal part 171 of the fender-side structural member 21 extends horizontally in the vehicle width direction, and a connection piece 171a which is connected to the apron-side structural member 22 is formed at an inward side, in the vehicle width direction, of the outward-side horizontal part 171. The connection piece 171a has a vertically-penetrating bolt hole.

As shown in FIGS. 4 and 6, the apron-side structural member 22 is provided with an apron-reinforcement fixing portion 13 which is fixed to an outer wall 5b of the apron reinforcement 5 via a vertical-wall shaped middle gusset 30B.

The middle gusset 30B is fixed to the outer wall 5b of the apron reinforcement 5 along the vehicle vertical direction. The apron-side structural member 22 is fixed to a vertical-wall shaped outer wall 30Ba of the middle gusset 30B by welding (e.g., spot welding) (see FIG. 4).

Further, since the middle bracket 10B is formed in the split structure comprising the fender-side structural member 21 and the apron-side structural member 22, only the apron-side structural member 22 can be welded to the middle gusset 30B before it is fastened to the fender-side structural member 21 when the apron-side structural member 22 is fixed to the middle gusset 30B.

Accordingly, when the apron-side structural member 22 is welded to the middle gusset 30B, the apron-side structural member 22 can be firmly welded to the middle gusset 30B without any interference of a welding gun or the like with the fender-side structural member 21.

Herein, the middle bracket 10B may be formed in a single structure, not in the above-described split structure.

As shown in FIGS. 4 and 6, the apron-side structural member 22 is formed integrally by an inward-side horizontal part 172 which extends horizontally in the vehicle width direction and the apron reinforcement fixing portion 13 which extends upwardly from an inward end, in the vehicle width direction, of the inward-side horizontal part 172 via a third curved part 18. A connection piece 172a which is connected to the fender-side structural member 21 is formed at an outward side, in the vehicle width direction, of the inward-side horizontal part 172. The connection piece 172a has a vertically-penetrating bolt hole.

The fender-side structural member 21 and the apron-side structural member 22 are connected together by using a fastening member (not illustrated) in a state where the connecting pieces 171a, 172a of the outward-side horizontal part 171 and the inward-side horizontal part 172 overlap each other in the vertical direction. In the present embodiment, the outward-side horizontal part 171 overlaps the inward-side horizontal part 172 from above (see FIGS. 4 and 6).

That is, the above-described horizontal part 17 is formed by the outward-side horizontal part 171 of the fender-side structural member 21 and the inward-side horizontal part 172 of the apron-side structural member 22. The horizontal part 17 extends horizontally and linearly in the vehicle width direction such that a lower end section of the first curved part 15 and a lower end section of the third curved part 18 are continuous to each other.

The middle bracket 10B is configured such that a flat face portion 25 (an upper step portion 25) positioned at a central portion, in the vehicle longitudinal direction (i.e., a bracket width direction), of the body portion 12 is located at a one-step higher level than flange portions 26 positioned at both outward-side portions, in the vehicle longitudinal direction, of the body portion 12 via step portions 27 (i.e., the middle bracket 10B is configured to be stepwise in its thickness direction).

In other words, the middle bracket 10B is formed integrally by the flat face portion 25 which extends, in a flat-face shape, in the vehicle longitudinal direction and in the extension direction of the middle bracket 10B and the flange portions 26 which extend longitudinally from the front-and-rear ends of the flat-face portion 25 via the step portions 27. Further, the flat-face portion 25 has a fastening face where the apron reinforcement 5 is fastened. The step portions 27 are formed such that they are bent, in the thickness direction (the vehicle vertical direction) of the middle bracket 10B, from the front end and the rear end of the flat-face portion 25.

That is, the flat-face portion 25 is configured to rise stepwise from the flange portions 26 toward one side db1 of a direction db perpendicular to a bracket surface (i.e., a surface extending in the vehicle longitudinal direction and the extension direction) of the middle bracket 10B (i.e., a thick direction of the middle bracket 10B). In the present embodiment, the above-described one side of the direction perpendicular to the bracket surface means an inward side, in a radial direction, of the first curved part 15 and an outward side, in a radial direction, of the second curved part 14.

The flat-face portion 25 is formed in a flat-face shape along the extension direction and the vehicle longitudinal direction. A boundary portion (corner portion) between the step portion 27 and the flat-face portion 25 and a boundary portion (corner portion) between the step portion 27 and the flange portion 26 are configured to have a curved cross section which is perpendicular to the vehicle longitudinal direction, respectively. The flange portions 26 are configured to project from their respective boundary portions with the step portion 27, in a direction away from each other, in the vehicle longitudinal direction.

As shown in FIG. 4, the flat-face portion 25, the step portions 27, and the flange portions 26 are configured to extend over an entire length, in the extension direction, of the middle bracket 10B including not only the body portion 12 but the fender-fixing portion 11 and the apron-reinforcement fixing portion 13. In the present embodiment, the flat-face portion 25, the step portions 27, and the flange portions 26 are configured to extend over the entire length, in the extension direction, of the middle bracket 10B (i.e., respective entire lengths of the fender-side structural member 21 and the apron-side structural member 22) continuously.

Herein, the middle bracket 10B may be alternatively configured to be partially concave or convex in the vehicle longitudinal direction (the bracket width direction), or provided with a bead extending in the extension direction or a rib which is configured to be partially thick in the vehicle longitudinal direction, not limited to the above-described step portions 27.

Further, while the step portion 27 of the present embodiment extends over the entire length, in the extension direction, of the middle bracket 10B, the present invention is not limited to this as long as the step portion 27 is provided at the body portion 12. For example, the step portion 27 may be provided at a partial part, in the extension direction, of the body portion 12.

Subsequently, structures of the front bracket 10A and the rear bracket 10C which are different from the middle bracket 10B will be described primarily. Herein, the same structures of the front bracket 10A and the rear bracket 10C as the middle bracket 10B are denoted by the same reference characters, description of which is omitted here.

As shown in FIGS. 1 and 7A, B, the front bracket 10A and the rear bracket 10C do not have the split structure unlike the middle bracket 10B, and these brackets 10A, 10B are respectively formed by a single member including not only the fender fixing portion 11 and the body portion 12 but the apron-reinforcement fixing portion 13.

Further, the front bracket 10A and the rear bracket 10C are not fixedly attached to the side of the outer wall 5b of the apron reinforcement 5 unlike the middle bracket 10B, but fixed to the side of the upper wall 5a of the apron reinforcement 5.

That is, the front bracket 10A and the rear bracket 10C extend horizontally and linearly in the vehicle width direction such that the horizontal part 17 and the apron-reinforcement fixing portion 13 are located substantially at the same level as the upper wall 5a of the apron reinforcement 5 (in other words, at a higher level than the horizontal part 17 (see FIG. 16) of the middle bracket 10B).

As shown in FIG. 7A particularly, the apron-reinforcement fixing portion 13 of the front bracket 10A extends from the inward end, in the vehicle width direction, of the horizontal part 17 of the body portion 12 toward the vehicle inward side, up to near the apron reinforcement 5 (up to a position located on the outward side of the outer wall 5b of the apron reinforcement 5), and the front bracket 10A is fixedly attached to the side of the upper wall 5a of the apron reinforcement 5 via a front gusset 30A.

As shown in FIGS. 1-3, the front gusset 30A is fixedly attached to the upper wall 5a of the apron reinforcement 5 at the same position, in the vehicle longitudinal direction, as the front bracket 10A. Further, as shown in FIG. 7A, the front gusset 30A is provided with an extension portion 30Aa which extends horizontally from the outward, in the vehicle width direction, of the upper wall 5a of the apron reinforcement 5 toward the outward side in the vehicle width direction. The apron-reinforcement fixing portion 13 of the front bracket 10A overlaps, in the vertical direction, the extension portion 30Aa of the front gusset 30A, and these are fixedly fastened by a fastening member (not illustrated).

Figure 7B:
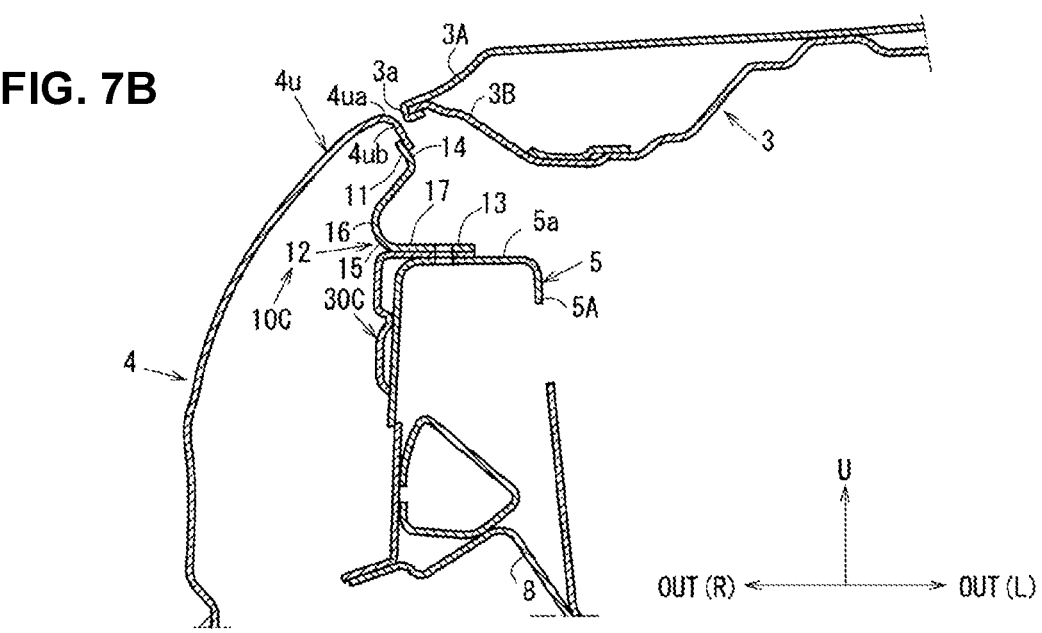
FIG. 7B is a major-part enlarged sectional view taken along line D-D of FIG. 3.

Meanwhile, as shown in FIG. 7B, the apron-reinforcement fixing portion 13 of the rear bracket 10C extends horizontally and linearly from the inward end, in the vehicle width direction, of the horizontal part 17 of the body portion 12 toward the vehicle inward side at a level which is right above the upper wall 5a of the apron reinforcement 5, and the rear bracket 10C is fixedly attached to the side of the upper wall 5a of the apron reinforcement 5 via a rear gusset 30C.

As shown in FIGS. 1-4, the rear gusset 30C is fixedly attached to the upper wall 5a of the apron reinforcement 5 at the same position, in the vehicle longitudinal direction, as the rear bracket 10C. The apron-reinforcement fixing portion 13 of the rear bracket 10C overlaps, in the vertical direction, the rear gusset 30C, and these are fixedly fastened by a fastening member (not illustrated).

In the present embodiment, when the fender 4 is assembled to the apron reinforcement 5 via the bracket 10 in a vehicle-body assembling process, respective clearances (distances), in the vehicle width direction and in the vehicle vertical direction, between the fender 4 and the bonnet 3 (see clearances A, B shown in FIG. 6) are adjusted by using the three members of the apron-side structural member 22 provided at the middle bracket 10B, the front gusset 30A, and the rear gusset 30C.

For example, the apron-side structural member 22 provided at the middle bracket 10B adopts a structure in which this member 22 is welded to the vertical-wall shaped outer wall 5b of the apron reinforcement 5 via the vertical-wall shaped middle gusset 30B as described above (see FIG. 4). Herein, reference character w in FIG. 4 shows a welding point by spot welding of the apron-side structural member 22 which is applied to the outer wall 30Ba of the middle gusset 30B.

Thus, when the apron-side structural member 22 is welded to the vertical-wall shaped middle gusset 30B, the clearance, in the vehicle vertical direction, between the fender 4 and the bonnet 3 (see the B clearance in FIG. 6) can be adjusted properly within a requested (desired) range by adjusting the welding points w of the apron-side structural member 22, in the vehicle vertical direction, relative to the vertical-wall shaped middle gusset 30B.

Herein, since the apron-side structural member 22 can be welded to the vertical-wall shaped middle gusset 30B before its fastening to the fender-side structural member 21, the fender-side structural member 21 does not hinder using of the welding gun for this welding of the apron-side structural member 22 to the middle gusset 30B, so that the smooth welding can be attained.

In this regard, it is preferable that the middle bracket 10B have the split structure comprising the apron-side structural member 22 and the fender-side structural member 21 as described above.

Further, the clearance, in the vehicle width direction, between the fender 4 and the bonnet 3 (see the A clearance in FIG. 6) can be adjusted properly within a requested (desired) range by adjusting the welding points of the front gusset 30A and the rear gusset 30C, in the vehicle width direction, relative to the upper-wall 5a of the apron reinforcement 5.

As shown in FIGS. 1-4, 6 and 7A, B, the front vehicle-body structure of the vehicle of the present embodiment comprises the bonnet (engine hood) 3 provided above the engine (power unit) (see FIGS. 1, 6 and 7A), the pair of right-and-left fenders 4 positioned on the outward side, in the vehicle width direction, of the bonnet 3 and provided at vehicle-body side portions, the pair of apron reinforcements 5 provided below the bonnet 3 and extending in the vehicle longitudinal direction, and the bracket 10 connecting the upper portion of the fender 4 and the apron reinforcement 5, wherein the bracket 10 comprises the fender fixing portion 11 which is fixed to the flange portion 4ub of the fender upper end portion 4u which extends downwardly from the fender upper edge side 4ua positioned on the outward side, in the vehicle width direction, of the bonnet 3, the body portion 12 which extends downwardly from the fender fixing portion 11 and is positioned on the outward side, in the vehicle width direction, of the apron reinforcement 5, and the apron-reinforcement fixing portion 13 which extends from the inward side, in the vehicle width direction, of the body portion 12 toward the apron reinforcement 5 and is fixed to the apron reinforcement 5, and the body portion 12 of the bracket 10 is provided with the first curved part 15 (curved part) which is configured to be curved outwardly in the vehicle width direction.

According to the present structure, the pedestrian protection performance in a case where a pedestrian hits against around the boundary between the bonnet 3 and the fender 4 and thereby a collision load (large load) is inputted to around this boundary can be improved. Meanwhile, the support rigidity of the fender 4 by means of the bracket 10 can be secured even against a small load inputted to the fender 4 by a hand pressing down the fender 4 or the like.

Specifically, a structure comprising an extension portion, such as a rain rail (rain gutter), which extends inwardly, in the vehicle width direction, from an upper portion of a vertical-wall shaped fender body to a lower side of the bonnet 3 along an inward edge, in the vehicle width direction, of the upper portion of the fender body is known as a conventional fender (not illustrated). This conventional fender has a problem described below.

In this conventional fender, the extension portion, such as the rain rail (rain gutter), extends inwardly, in the vehicle width direction, from the fender body such that it is interposed vertically between the bonnet 3 and the apron reinforcement 5 provided at a position which is downwardly separated from the bonnet 3, and this extension portion is supported at the upper wall 5a of the apron reinforcement 5.

In this conventional structure, however, there is a concern that in a case where the collision load is inputted to around the boundary between the bonnet 3 and the fender 4, the downward deformation of the bonnet 3 may be hindered by a part (the above-described extension portion) of the fender 4 which exists between the bonnet 3 and the upper wall 5a of the apron reinforcement 5.

According to the present embodiment, since the fender fixing portion 11 of the bracket 10 (10A, 10B, 10C) is fixed to the flange portion 4ub of the fender upper end portion 4u which is positioned on the outward side, in the vehicle width direction, of the upper end of the fender 4 and the bonnet 3, substantially no part of the fender 4 exists between the bonnet 3 and the upper face of the apron reinforcement 5, so that the proper downward deformation of the bonnet 3 can be attained (see FIGS. 6 and 7A, B).

Further, since the body portion 12 of the bracket 10 has the first curved part 15 which is positioned on the outward side, in the vehicle width direction, of the apron reinforcement 5 and configured to be curved outwardly in the vehicle width direction, the first curved part 15 can cause the bracket 10 to be deformed, without any part of the bracket 10 existing between the upper portion of the fender 4 and the apron reinforcement 5, in the case where the pedestrian hits against around the boundary between the bonnet 3 and the fender 4 and thereby the collision load is inputted to around this boundary from the upper side.

Accordingly, according to the present embodiment, the bonnet 3 can be securely deformed downwardly securely in the case where the pedestrian hits against around the boundary between the bonnet 3 and the fender 4 and thereby the collision load is inputted to around this boundary, so that the pedestrian protection performance can be improved.

Meanwhile, since the first curved part 15 of the body portion 12 of the bracket 10 according to the present embodiment has a smoother curved shape than a bent portion which is configured to be bent in an acute-angle shape, it is prevented that stress concentration occurs at the bracket 10 in the case where the small load is inputted to the fender 4, so that the deformation of the bracket 10 can be suppressed.

Thus, the support rigidity of the fender 4 against the small load inputted to the fender 4 by the hand pressing down the upper portion of the fender 4 or the like can be secured by means of the bracket 10.

In the embodiment of the present invention, as shown in FIGS. 4, 5A, B, 6 and 7A, B, the body portion 12 of the bracket 10 is provided with the inclined part 16 which is positioned between the fender fixing portion 11 and the first curved part 15 (curved part) and configured to be inclined obliquely downwardly-and-outwardly.

According to this embodiment, in the case where the pedestrian hits against around the boundary between the bonnet 3 and the fender 4, the inclined part 16 is displaced downwardly according to the downward deformation of a section of the fender 4 which is located around the boundary with the bonnet 3. Accordingly, the first curved part 15 can be crushed and deformed, and thereby the collision energy can be absorbed by the bracket 10.

In the embodiment of the present invention, as shown in the same figures, the body portion 12 of the bracket 10 is provided with the second curved part 14 which is positioned between the fender fixing portion 11 and the first curved part 15 and configured to be curved inwardly in the vehicle width direction.

According to this embodiment, since the body portion 12 of the bracket 10 has the first curved part 15 and the second curved part 14, not only the first curved part 15 but the second curved part 14 can cause the deformation of the bracket 10 in the case where the collision load (large load) is inputted to around the boundary between the bonnet 3 and the fender 4.

Accordingly, the bonnet 3 can be deformed more in the space between the bonnet 3 and the upper wall 5a of the apron reinforcement 5 by crushing the bracket 10 completely against the collision load, so that the pedestrian protection performance can be further improved.

In the embodiment of the present invention, the body portion 12 of the bracket 10 is formed in a plate shape, which comprises the flat-face part 25 which extends in the flat-face shape and is provided with a fastening face fixedly fastened to the apron reinforcement 5 and the step parts 27 (flange parts) which are bent, in a thick direction of the body portion 12, from the front end and the rear end of the flat-face part 25.

According to this embodiment, the collision energy which may not be absorbed by the curved parts 15, 14 only when the bracket 10 is crushed in the case where the pedestrian hits against around the boundary between the bonnet 3 and the fender 4 can be absorbed by the step parts 27.

Meanwhile, the support rigidity of the fender 4 against the small load inputted to the fender by the hand pressing down the fender 4 or the like can be increased by the step parts 27.

In the embodiment of the present invention, the apron-reinforcement fixing portion 13 is fixed to the outer wall 5b (side wall portion) of the apron reinforcement 5 as shown in the same figures.

According to this embodiment, when the vehicle is assembled, i.e., when the fender 4 is attached to the apron reinforcement 5 via the bracket 10, a gap or dispersion, in the vehicle vertical direction, of a distance between the fender 4 and the bonnet 3 can be adjusted.

The present invention is not limited to the above-described embodiment. For example, the bracket of the present invention is not limited to the bracket 10 of the above-described embodiment which is provided with the first and second curved parts 15, 14 and the inclined part 16, but adopts any other structure as long as the bracket comprises the fender fixing portion 11 fixed to the flange portion 4ub of the fender upper end portion 4u, the body portion 12 extending downwardly from the fender fixing portion 11 and positioned on the outward side, in the vehicle width direction, of the apron reinforcement 5, and the apron-reinforcement fixing portion 13 extending from the inward side, in the vehicle width direction, of the body portion 12 toward the apron reinforcement 5 and fixed to the apron reinforcement 5.

Figure 8:
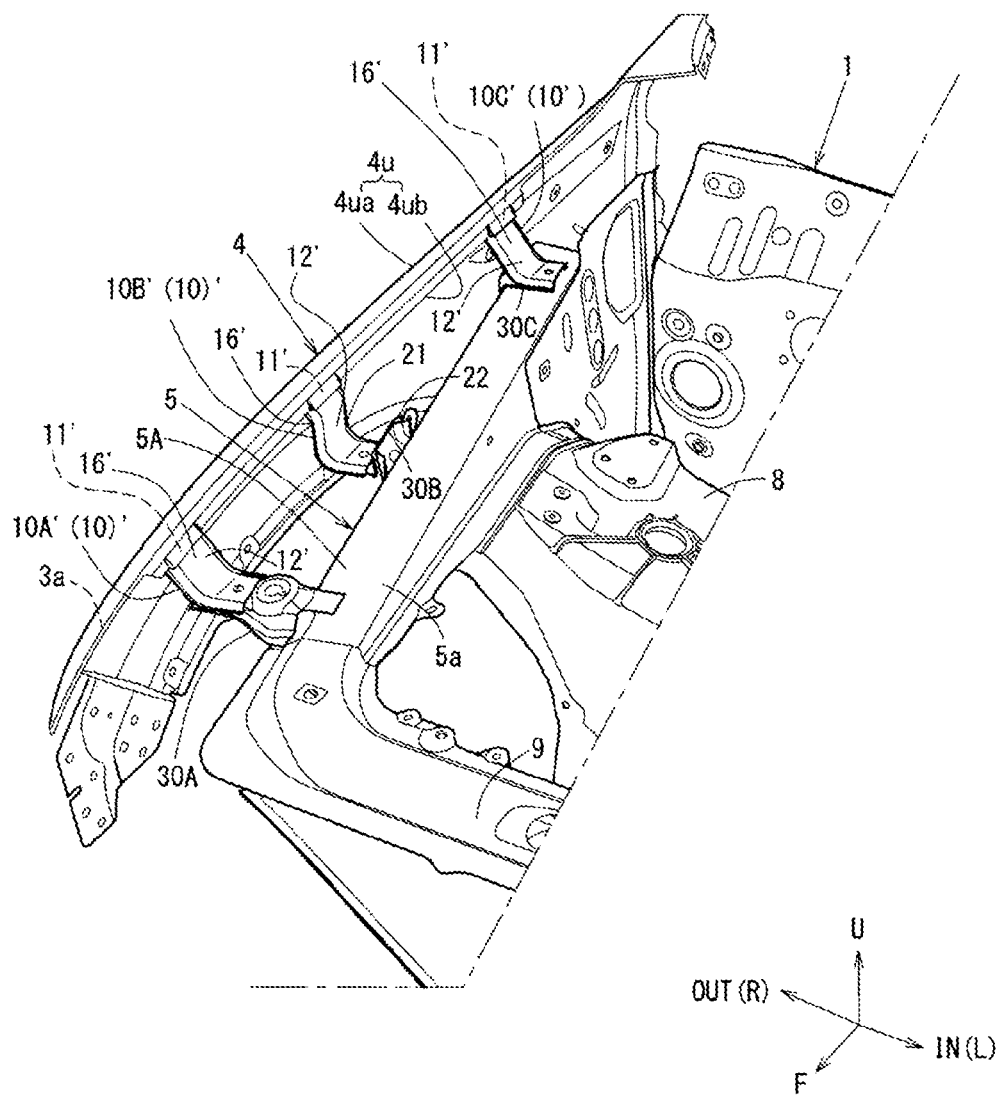
FIG. 8 is a perspective view of a front vehicle-body structure of the vehicle according to a modification of the present embodiment, which corresponds to FIG. 1.
Figure 9A:
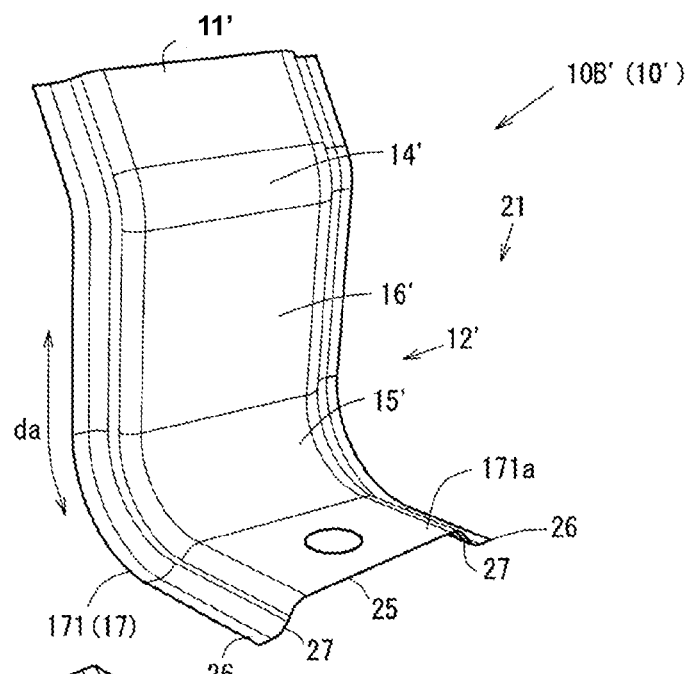
FIGS. 9A, 9B are views of the front vehicle-body structure of the vehicle according to the modification of the present embodiment, which correspond to FIGS. 5A, 5B, respectively.
Figure 9B:
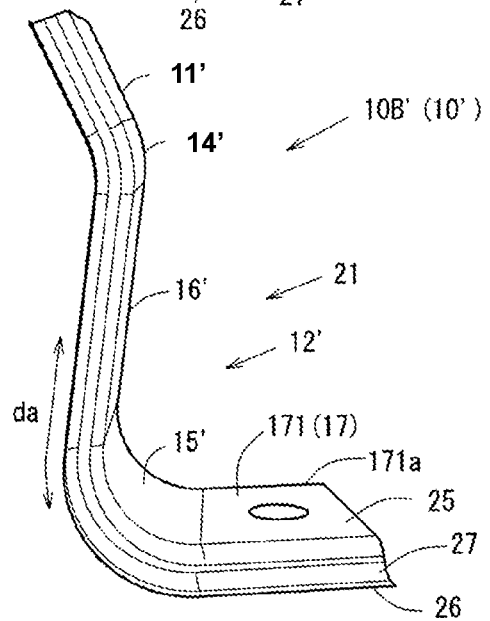

Specifically, the bracket of the front vehicle-body structure of the present invention may be configured like a middle bracket 10B' (10') according to a modification shown in FIGS. 8 and 9A, B in which an inclined part 16' of a body portion 12' is slightly inclined such that its lower side is positioned on the outward side in the vehicle width direction, but this is nearly parallel to the vehicle vertical direction.

Further, the bracket of the front vehicle-body structure of the present invention may be configured like a front bracket 10A' (10') and a rear bracket 10C' (10') according to the modification shown in FIG. 8 in which the body portion 12' is not provided with the second curved part 14 unlike the above-described embodiment and the inclined part 16' is inclined from the lower end (inward end in the vehicle width direction), having the same inclination angle as the fender fixing portion 11', such that its lower side is positioned on the inward side in the vehicle width direction. That is, the body portion 12' may not be provided with the curved parts 15, 14.

While the front bracket 10A and the rear bracket 10C are fixedly attached to the upper wall 5a of the apron reinforcement 5 via the respective gussets 30A, 30C, these may be directly joined to the upper wall 5a of the apron reinforcement 5. Likewise, while the middle bracket 10B is fixedly attached to the upper wall 5a of the apron reinforcement 5 via the middle gusset 30B, this may be directly joined to the upper wall 5a of the apron reinforcement 5 as well.

What is claimed is:

1. A front vehicle-body structure of a vehicle, comprising:
a bonnet provided above a power unit;
a pair of right-and-left fenders positioned on an outward side, in a vehicle width direction, of the bonnet and provided at vehicle-body side portions;
a pair of apron reinforcements provided below the bonnet and extending in a vehicle longitudinal direction; and
a bracket connecting an upper portion of the fender and the apron reinforcement,
wherein said bracket comprises a fender fixing portion fixed to an upper end portion of said fender, a body portion extending downwardly from the fender fixing portion and positioned on an outward side, in the vehicle width direction, of said apron reinforcement, and an apron-reinforcement fixing portion fixed to the apron reinforcement, and said body portion of the bracket is provided with a curved part which is configured to be curved outwardly in the vehicle width direction,
wherein said curved part of the body portion of the bracket is configured as a first curved part, and said body portion of the bracket is provided with a second curved part which is positioned between said fender fixing portion and said first curved part and configured to be curved inwardly in the vehicle width direction.

2. The front vehicle-body structure of the vehicle of claim 1, wherein said body portion of the bracket is provided with an inclined part which is positioned between said fender fixing portion and said curved part and configured to be inclined obliquely downwardly-and-outwardly.

3. A front vehicle-body structure of a vehicle comprising:
a bonnet provided above a power unit;
a pair of right-and-left fenders positioned on an outward side, in a vehicle width direction, of the bonnet and provided at vehicle-body side portions;
a pair of apron reinforcements provided below the bonnet and extending in a vehicle longitudinal direction; and
a bracket connecting an upper portion of the fender and the apron reinforcement,
wherein said bracket comprises a fender fixing portion fixed to an upper end portion of said fender, a body portion extending downwardly from the fender fixing portion and positioned on an outward side, in the vehicle width direction, of said apron reinforcement, and an apron-reinforcement fixing portion fixed to the apron reinforcement, and said body portion of the bracket is provided with a curved part which is configured to be curved outwardly in the vehicle width direction,
wherein said body portion of the bracket is formed in a plate shape, which comprises a flat-face part which extends in a flat-face shape and is provided with a fastening face fixedly fastened to said apron reinforcement and flange parts which are bent, in a thick direction of the body portion, from a front end and a rear end of said flat-face part.

4. The front vehicle-body structure of the vehicle of claim 1, wherein said apron-reinforcement fixing portion is fixed to a side wall portion of said apron reinforcement.

5. The front vehicle-body structure of the vehicle of claim 2, wherein said body portion of the bracket is formed in a plate shape, which comprises a flat-face part which extends in a flat-face shape and is provided with a fastening face fixedly fastened to said apron reinforcement and flange parts which are bent, in a thick direction of the body portion, from a front end and a rear end of said flat-face part.

6. The front vehicle-body structure of the vehicle of claim 2, wherein said apron-reinforcement fixing portion is fixed to a side wall portion of said apron reinforcement.

7. The front vehicle-body structure of the vehicle of claim 1, wherein said body portion of the bracket is formed in a plate shape, which comprises a flat-face part which extends in a flat-face shape and is provided with a fastening face fixedly fastened to said apron reinforcement and flange parts which are bent, in a thick direction of the body portion, from a front end and a rear end of said flat-face part.

8. The front vehicle-body structure of the vehicle of claim 1, wherein said apron-reinforcement fixing portion is fixed to a side wall portion of said apron reinforcement.

9. The front vehicle-body structure of the vehicle of claim 3, wherein said apron-reinforcement fixing portion is fixed to a side wall portion of said apron reinforcement.

10. The front vehicle-body structure of the vehicle of claim 5, wherein said apron-reinforcement fixing portion is fixed to a side wall portion of said apron reinforcement.

11. The front vehicle-body structure of the vehicle of claim 7, wherein said apron-reinforcement fixing portion is fixed to a side wall portion of said apron reinforcement.

12. A front vehicle-body structure of a vehicle comprising:
a bonnet provided above a power unit;
a pair of right-and-left fenders positioned on an outward side, in a vehicle width direction, of the bonnet and provided at vehicle-body side portions;
a pair of apron reinforcements provided below the bonnet and extending in a vehicle longitudinal direction; and
a bracket connecting an upper portion of the fender and the apron reinforcement,
wherein said bracket comprises a fender fixing portion fixed to an upper end portion of said fender, a body portion extending downwardly from the fender fixing portion and positioned on an outward side, in the vehicle width direction, of said apron reinforcement, and an apron-reinforcement fixing portion fixed to the apron reinforcement, and said body portion of the bracket is provided with a curved part which is configured to be curved outwardly in the vehicle width direction,
wherein said body potion of the bracket is provided with a first cured part and a second curved part, the second curved part being configured to protrude inwardly, in the vehicle width direction, at an upper end portion of the body portion which is a boundary area with said fender-fixing portion, the first curved part being configured to protrude outwardly, in the vehicle width direction, below said second curved part.

13. The front vehicle-body structure of the vehicle of claim 12, wherein said body portion of the bracket is provided with an inclined part and a horizontal part, the inclined part being positioned between said first curved part and said second curved part and configured to extend substantially linearly in an inclined shape such that a lower side thereof is positioned on the outward side in the vehicle width direction, the horizontal part being positioned between said first curved part and said apron-reinforcement fixing portion and configured to extend substantially horizontally and linearly in the vehicle width direction.

14. The front vehicle-body structure of the vehicle of claim 13, wherein said bracket is formed in a split structure which comprises a fender-side structural member and an apron-side structural member, said fender-side structural member is configured such that an inward end, in the vehicle width direction, of a lower section of said fender fixing portion and an inward end, in the vehicle width direction, of an upper section of said inclined part are connected via said second curved part, whereas an outward end, in the vehicle width direction, of a lower section of said inclined part and an outward end, in the vehicle width direction, of an outward-side horizontal part of the horizontal part are connected via said first curved part.

\* \* \* \* \*